(12) United States Patent
Murakoshi

(10) Patent No.: US 7,995,440 B2
(45) Date of Patent: Aug. 9, 2011

(54) INFORMATION PROCESSING APPARATUS AND METHOD, PROGRAM, AND RECORDING MEDIUM

(75) Inventor: Sho Murakoshi, Tokyo (JP)

(73) Assignee: Sony Corporation (JP)

( * ) Notice: Subject to any disclaimer, the term of this patent is extended or adjusted under 35 U.S.C. 154(b) by 576 days.

(21) Appl. No.: 12/220,418

(22) Filed: Jul. 24, 2008

(65) Prior Publication Data

US 2009/0028025 A1   Jan. 29, 2009

(30) Foreign Application Priority Data

Jul. 26, 2007   (JP) ................................ P2007-194506

(51) Int. Cl.
*G11B 5/58* (2006.01)
(52) U.S. Cl. ..................................................... 369/53.41
(58) Field of Classification Search .................. None
See application file for complete search history.

(56) References Cited

U.S. PATENT DOCUMENTS

| 5,191,528 A * | 3/1993 | Yardley et al. ............... 701/23 |
| 6,353,584 B1 * | 3/2002 | Koyata .......................... 369/47.13 |
| 2010/0080101 A1 * | 4/2010 | Rochat et al. ............ 369/53.41 |

FOREIGN PATENT DOCUMENTS

JP   05-028717 A   2/1993

* cited by examiner

*Primary Examiner* — Daniell L Negrón
*Assistant Examiner* — Parul Gupta
(74) *Attorney, Agent, or Firm* — Lerner, David, Littenberg, Krumholz & Mentlik, LLP

(57) ABSTRACT

An information processing apparatus which detects concomitant information associated with a time at which data satisfying a preset condition is supplied within a continuous period of time from input data that is temporally continuously input is disclosed. The apparatus includes: a change information detecting means for detecting temporally continuous characteristic quantity change information based on the characteristic quantity in a first period's worth of input data; an accumulation means for accumulating the characteristic quantity change information to obtain characteristic quantity change information associated with temporally continuous input data for a second period; a concomitant information detecting means for detecting the concomitant information based on the characteristic quantity change information; an accumulated amount identifying means for identifying the amount of characteristic quantity change information; and a priority determining means for determining the priority of the processes of the change information detecting means and the concomitant information detecting means.

9 Claims, 9 Drawing Sheets

INFORMATION PROCESSING APPARATUS AND METHOD, PROGRAM, AND RECORDING MEDIUM

CROSS-REFERENCE TO RELATED APPLICATIONS

The present application claims priority from Japanese Patent Application No. JP 2007-194506, filed in the Japanese Patent Office on Jul. 26, 2007, the entire content of which is incorporated here by reference.

BACKGROUND OF THE INVENTION

1. Field of the Invention

The present invention relates to an information processing apparatus and method, and a program and a recording medium for the same. In particular, the invention relates to an information processing apparatus and method which allow desired data to be efficiently extracted in various types of electronic equipment and to a program and a recording medium for the same.

2. Description of the Related Art

Recently, it is becoming easier to record a large amount of contents as a result of the spread of HDD (Hard Disk Drive) recorders, for example. Further, in order to allow a user to view a large amount of recorded contents efficiently when the contents are reproduced, the detection of metadata is carried out to identify, for example, a scene satisfying a preset condition among the contents.

In a process of extracting metadata from temporally continuous data such as data of broadcasted contents, it is important to detect changes occurring on a time axis in a quantity such as a predetermined characteristic quantity detected from input data. For this purpose, it is necessary to refer to past data on the time axis and to compare the data with a predetermined characteristic quantity detected from data which is currently input using, for example, a detector for extracting metadata. It is also necessary to provide a buffer for accumulating temporally continuous data for a predetermined period of time.

A technique for allowing an editing operation to be performed more efficiently has been proposed. According to the technique, a display element displays a still image composed of a plurality of slit-like images showing an overall flow of the still image. General outlines of audio data associated with the slit-like images such as levels and types of the data are visually displayed in association with the respective slit-like images forming the still image. Thus, an overall flow of images and sounds can be accurately recognized.

An example of the related art include Japanese Patent No. 3158291 (Patent Document 1).

SUMMARY OF THE INVENTION

However, in the case of the configuration in which past data is referred to and compared with a predetermined characteristic quantity detected from currently input data, the process of comparing the data with the characteristic quantity cannot be performed unless the data to be compared is accumulated for a predetermined time period. As a result, for example, the process is delayed by the accumulation of data, and it becomes difficult to perform the process efficiently.

The process of extracting metadata by detecting a characteristic quantity has been developed as a function to be provided in what are called AV (audio-visual) home electronics such as HDD recorders. Recently, apparatus having an image recording/reproducing function such as personal computers and game machines are spreading, and there are increasing needs for providing the metadata extracting function in various electronic apparatus. However, an enormous amount of time and labor will be required for tuning the apparatus.

Thus, it is desirable to extract desired data efficiently in various types of electronic apparatus.

According to an embodiment of the invention, there is provided an information processing apparatus which detects concomitant information associated with a time at which data satisfying a preset condition is supplied within a continuous period of time from input data that is temporally continuously input, the apparatus including:

a change information detecting means for detecting information on a change in a temporally continuous characteristic quantity based on the characteristic quantity that is included in a first period's worth of input data that is temporally continuously input;

an accumulation means for accumulating the characteristic quantity change information output by the change information detecting means to obtain characteristic quantity change information associated with temporally continuous input data for a second period of time longer than the first period of time;

a concomitant information detecting means for detecting the concomitant information based on the characteristic quantity change information accumulated in the accumulation means;

an accumulated amount identifying means for identifying the amount of characteristic quantity change information accumulated in the accumulation means; and a priority determining means for determining the priority of the process of the change information detecting means and the process of the concomitant information detecting means based on the accumulated amount identified by the accumulated amount identifying means.

The change information detecting means and the concomitant information detecting means may detect the characteristic quantity change information and the concomitant information, respectively, using the same information processing resource.

When the priority of the process of the change information detecting means is higher than the priority of the process of the concomitant information detecting means, the change information detecting means may detect the change information in an amount per unit time greater than the amount of the change information read out from the accumulation means by the concomitant information detecting means to detect the concomitant information and may accumulate the change information in the accumulation means.

The accumulated amount identifying means may identify the accumulated amount by comparing the amount of the characteristic quantity change information accumulated in the accumulation means with a preset threshold.

The accumulated amount identifying means may identify the accumulated amount by comparing the amount of the characteristic quantity change information currently accumulated in the accumulation means with the amount of the characteristic quantity change information which has been accumulated in the accumulation means at a time preceding the current time by a predetermined amount.

The temporally continuous information may be information of a dynamic image or sound, and the concomitant information may be detected as metadata of the dynamic image or sound.

According to the embodiment of the invention, there is provided an information processing method for an information processing apparatus which detects concomitant information associated with a time at which data satisfying a preset condition is supplied within a continuous period of time from input data that is temporally continuously input and which includes a change information detecting means for detecting information on a change in a temporally continuous characteristic quantity based on the characteristic quantity that is included in a first period's worth of input data that is temporally continuously input, an accumulation means accumulating the characteristic quantity change information output by the change information detecting means to obtain characteristic quantity change information associated with temporally continuous input data for a second period of time longer than the first period of time, and a concomitant information detecting means for detecting the concomitant information based on the characteristic quantity change information accumulated in the accumulation means, the method including the steps of:

identifying the amount of characteristic quantity change information accumulated in the accumulation means; and determining the priority of the process of the change information detecting means and the process of the concomitant information detecting means based on the accumulated amount identified by the accumulated amount identifying means.

According to the embodiment of the invention, there is provided a program for causing a computer to execute a process of detecting concomitant information associated with a time at which data satisfying a preset condition is supplied within a continuous period of time from input data that is temporally continuously input, the program causing the computer to function as:

a change information detecting means for detecting information on a change in a temporally continuous characteristic quantity based on the characteristic quantity that is included in a first period's worth of input data that is temporally continuously input;

an accumulation means for accumulating the characteristic quantity change information output by the change information detecting means to obtain characteristic quantity change information associated with temporally continuous input data for a second period of time longer than the first period of time;

a concomitant information detecting means for detecting the concomitant information based on the characteristic quantity change information accumulated in the accumulation means;

an accumulated amount identifying means for identifying the amount of characteristic quantity change information accumulated in the accumulation means; and a priority determining means for determining the priority of the process of the change information detecting means and the process of the concomitant information detecting means based on the accumulated amount identified by the accumulated amount identifying means.

According to the embodiment of the invention, information on a change in a temporally continuous characteristic quantity based on the characteristic quantity that is included in a first period's worth of input data that is temporally continuously input. The characteristic quantity change information output by the change information detecting means is accumulated to obtain characteristic quantity change information associated with temporally continuous input data for a second period of time longer than the first period of time. The concomitant information is detected based on the characteristic quantity change information thus accumulated. The amount of characteristic quantity change information accumulated is identified, and the priority of the change information detecting process and the concomitant information detecting process is determined based on the accumulated amount thus identified.

The invention allows desired data to be efficiently extracted in various types of electronic apparatus.

DESCRIPTION OF THE PREFERRED EMBODIMENTS

Figure 1:
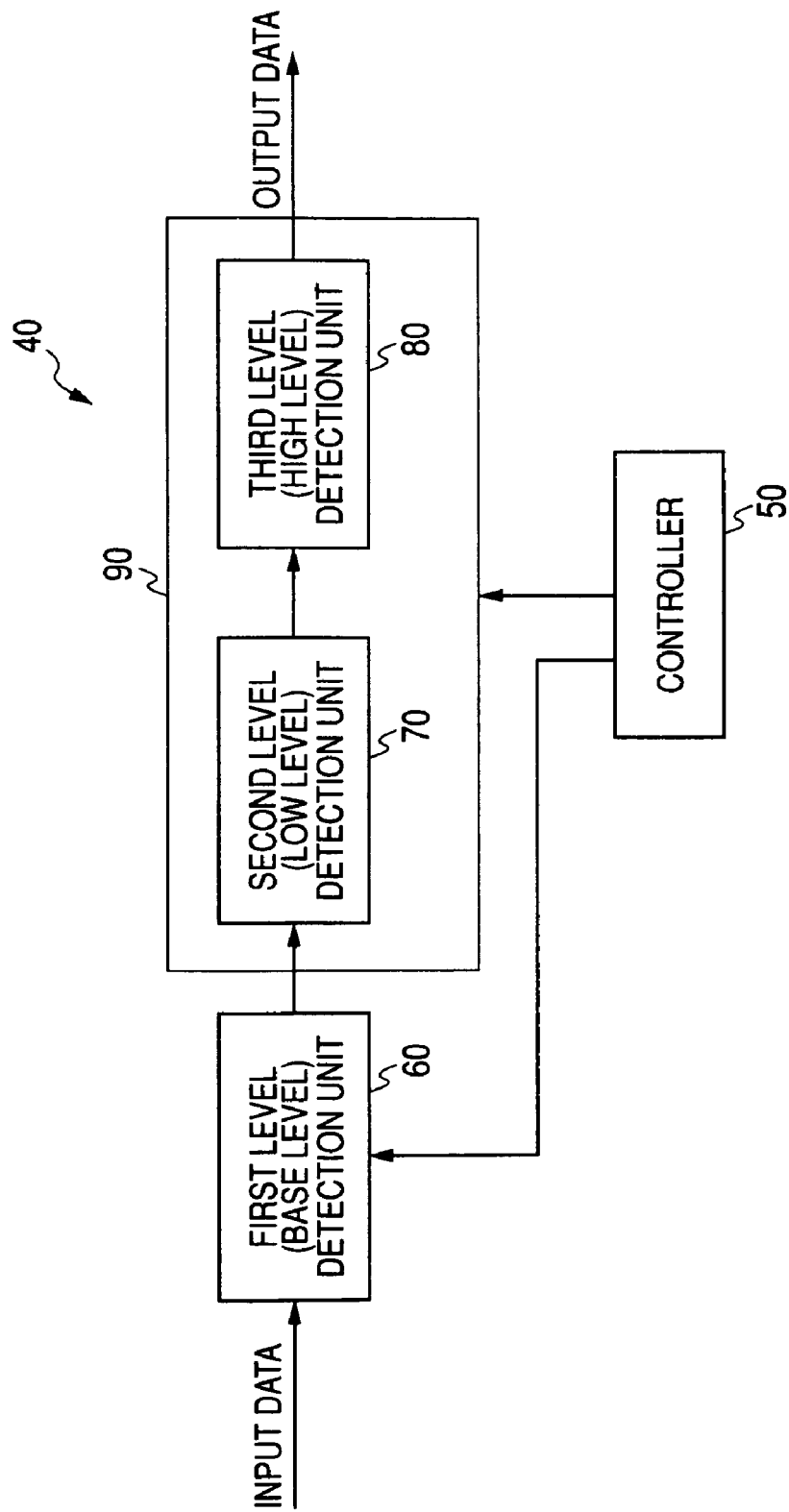
FIG. 1 is a block diagram showing an example of a configuration of a metadata extraction apparatus according to an embodiment of the invention.

Embodiments of the invention will now be described. Correspondence between constituent features of the invention and the embodiment of the invention shown in the specification and the drawings is shown below by way of example. The following description is provided to show that an embodiment supporting the invention is shown in the specification and the drawings. Therefore, even if a feature of the embodiment described in the specification or drawings is not listed below as corresponding to a constituent feature of the invention, it should not be understood that the feature of the embodiment does not correspond to the constituent feature. Conversely, even if a feature of the embodiment is described as corresponding to a constituent feature of the invention, it should not be understood that the feature of the embodiment does not correspond to other constituent features of the invention.

According to an embodiment of the invention, there is provided an information processing apparatus which detects concomitant information (e.g., metadata) associated with a time at which data satisfying a preset condition is supplied within a continuous period of time from input data that is temporally continuously input. The apparatus includes a change information detecting means (e.g., a low level detection unit 70 shown in FIG. 1) detecting information on a change in a temporally continuous characteristic quantity (e.g., intermediate data) based on the characteristic quantity that is included in a first periods worth of input data that is temporally continuously input, an accumulation means (e.g., a buffer 81 shown in FIG. 3) accumulating the characteristic quantity change information output by the change information detecting means to obtain characteristic quantity change information associated with temporally continuous input data for a second period of time longer than the first period of time, a concomitant information detecting means (e.g., a high level detection unit 80 shown in FIG. 1) detecting the concomitant information based on the characteristic quantity change information accumulated in the accumulation means, an accumulated amount identifying means (e.g., a buffer information acquisition section 154 shown in FIG. 4) identifying the amount of characteristic quantity change information accumulated in the accumulation means, and a priority determining means (e.g., a task priority management section 153 shown in FIG. 4) determining the priority of the process of the change information detecting means and the process of the concomitant information detecting means based on the accumulated amount identified by the accumulated amount identifying means.

According to the embodiment of the invention, there is provided an information processing method for a information processing apparatus which detects concomitant information (e.g., metadata) associated with a time at which data satisfying a preset condition is supplied within a continuous period of time from input data that is temporally continuously input and which includes a change information detecting means (e.g., the low level detection unit 70 shown in FIG. 1) detecting information on a change in a temporally continuous characteristic quantity (e.g., intermediate data) based on the characteristic quantity that is included in a first period's worth of input data that is temporally continuously input, an accumulation means (e.g., the buffer 81 shown in FIG. 3) accumulating the characteristic quantity change information output by the change information detecting means to obtain characteristic quantity change information associated with temporally continuous input data for a second period of time longer than the first period of time, and a concomitant information detecting means (e.g., the high level detection unit 80 shown in FIG. 1) detecting the concomitant information based on the characteristic quantity change information accumulated in the accumulation means. The method includes the steps of identifying the amount of characteristic quantity change information accumulated in the accumulation means (e.g., the process at step S122 shown in FIG. 7) and determining the priority of the process of the change information detecting means and the process of the concomitant information detecting means based on the accumulated amount thus identified (e.g., the process at steps S124 and S125 shown in FIG. 7).

The embodiment of the invention will now be described with reference to the drawings.

FIG. 1 is a block diagram showing an example of a configuration of a metadata extraction apparatus 40 according to the embodiment of the invention. The metadata extraction apparatus 40 extracts metadata from temporally continuous data input thereto as input data and provides output data that is data obtained by adding the metadata to the input data.

For example, the input data is temporally continuous data such as data of dynamic images and sounds. The metadata is information which identifies a section of data of dynamic images and sounds satisfying a predetermined condition. The input data is data of contents including, for example, dynamic images and sounds. For example, the metadata is information which identifies a section of the contents such as a highlight scene, a scene having a subtitle superimposed thereon, or a commercial message.

For example, the metadata extraction apparatus 40 is configured as an HDD (Hard Disk Drive) recorder, and the apparatus extracts metadata from contents recorded on an HDD and presents the data to a user as occasion demands.

The metadata extraction apparatus 40 shown in FIG. 1 includes a controller 50, a first level detection unit 60, and an output data generation unit 90. In this embodiment, the output data generation unit 90 includes a second level detection unit 70 and a third level detection unit 80.

That is, the metadata extraction apparatus 40 shown in FIG. 1 detects three levels of information, i.e., first, second, and third levels. The first level detection unit, the second level detection unit, and the third level detection unit may be referred to as a base level detection unit, a low level detection unit, and a high level detection unit, respectively.

The base level detection unit 60 detects characteristic quantities from input data itself. The base level detection unit 60 accepts input of data of images and sounds associated with a predetermined number of frames (e.g., one frame). The unit detects quantities characteristic of information representing a histogram of the luminance of images for the predetermined number of frames, information representing the contrast of the images for the predetermined number of frames, information representing edge intensities of the images, information representing levels of the sounds, and information representing frequency components of the sounds. Data associating the detected characteristic quantities with frame positions (times) of the input data is output to the output data generation unit 90.

For example, the base level detection unit 60 is formed by independent hardware. When data of an image and a sound in a first frame is input, the unit 60 detects quantities characteristic of the image and sound in the first frame and outputs base level output data. When data of an image and a sound in a second frame is input, the unit 60 detects quantities characteristic of the image and sound in the second frame and outputs base level output data.

The output data generation unit 90 generates output data based on the base level output data supplied from the base level detection unit 60. For example, the unit 90 includes a processor and a memory provided therein, and the processor executes software such as a program to cause the low level detection unit 70 and the high level detection unit 80 to perform respective predetermined processes.

Based on the base level output data output by the base level detection unit 60, the low level detection unit 70 detects, for example, information indicating whether a cut change or shot change has occurred in the contents and indicating whether a subtitle has been detected or information representing a motion vector of the image or characteristics of the sound as intermediate data. Data associating the detected intermediate data with a section of the input data is output to the high level detection unit 80 as low level output data.

For example, the low level detection unit 70 includes a buffer capable of accumulating base level output data associated with several seconds worth of temporally continuous input data. The unit detects the intermediate data and outputs the low level output data, for example, by comparing the base level output data accumulated in the buffer with base level output data which is being currently input.

Based on the low level output data output by the low level detection unit 70, for example, the high level detection unit 80 detects metadata that is information identifying a section containing a highlight scene, a scene having a subtitle superimposed thereon, or a commercial message among the contents. The unit outputs data associating the detected metadata with the section of the input data as high level output data. That is, the high level output data constitutes output data of the metadata extraction apparatus 40.

For example, the high level detection unit 80 includes a buffer capable of accumulating low level output data associated with several minutes' worth of temporally continuous input data. The unit detects the metadata and outputs the high level output data, for example, by comparing a predetermined section of the low level output data accumulated in the buffer with another section or comparing the low level output data accumulated in the buffer with low level output data which is currently being input.

For example, the controller 50 includes a processor and a memory. The processor executes software such as a program to generate various types of control signals and supplies the control signals to the base level detection unit 60 or output data generation unit 90. Thus, various parts of the metadata extraction apparatus 40 are controlled.

Figure 2:
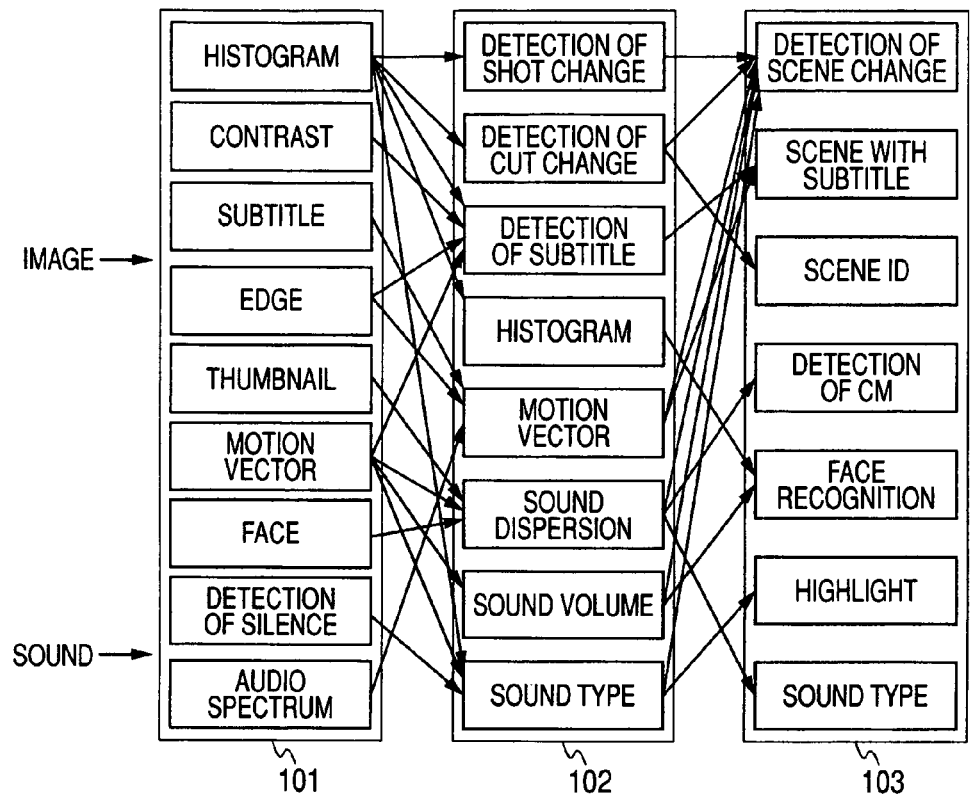
FIG. 2 shows examples of characteristics quantities detected by a base level detection unit, intermediate data detected by a low level detection unit, and metadata detected by a high level detection unit, those units being shown in FIG. 1.

FIG. 2 shows examples of characteristics quantities detected by the base level detection unit 60, intermediate data detected by the low level detection unit 70, and metadata detected by the high level detection unit 80.

Data 101 in FIG. 2 is an example of data detected as characteristic quantities. In this embodiment, each piece of data 101 includes information detected from one frame worth of image data such as a histogram of the luminance of the image, the contrast of the image, whether the image includes a subtitle superimposed thereon, an edge intensity of the image, a thumbnail image (e.g., a reduced image) obtained from the image, and a motion vector of the image.

Each piece of data 101 also includes information detected from the one frame worth of image data such as whether the sound level is 0 or not (whether silence is detected) and the intensity of each frequency component included in the sound (an audio vector).

Pieces of data 101 each of which is detected as characteristic quantities of one frame are accumulated in a quantity that is worth several seconds of data of the contents or several tens frames. Data 102 is detected as intermediate data based on the accumulated data 101.

For example, information indicating whether a shot change or cut change has occurred or not included in the data 102 is generated based on the histogram information included in the data 101. Information indicating whether a subtitle has been detected or not included in the data 102 is generated based on the histogram information, the contrast information, the edge information, and the motion vector information included in the data 101.

In this embodiment, the data 102 also includes information representing histograms of the images in the several tens frames, motion vectors of the images, the dispersion, volumes, and types of sounds in the several tens frames.

As thus described, the data 102 detected as intermediate data is data associated with several tens frames (several seconds) worth of temporally continuous contents data.

The data 102 detected as several tens frames' worth of intermediate data is accumulated until it reaches an amount that is worth several minutes of data of the contents, and data 103 is detected as metadata based on the data 102 thus accumulated.

For example, information indicating whether a scene change has occurred or not included in the data 103 is generated based on information included in the data 102 such as information on the detection of a shot change and the detection a cut change and information on motion vectors and dispersion of sounds. Information indicating whether the scene has a subtitle or not included in the data 103 is generated based on information included in the data 103 such as information on the detection of a subtitle and information on motion vectors.

In this embodiment, the data 103 also includes scene IDs such as numbers identifying scenes, information indicating whether a commercial message has been detected or not, whether the scene is a highlight scene or not, and information on sound types.

As thus described, the data 103 detected as metadata is data associated with several minutes' worth of temporally continuous contents data.

A scene (e.g., a temporally continuous section lasting several minutes) satisfying a predetermined condition is searched based on such metadata. For example, a boundary between a commercial message and a program, a boundary between different contents in a program, or a scene change in a drama or movie is thus searched to start reproduction at that point, which allows recorded contents to be efficiently viewed.

The pieces of data 101, 102, and 103 shown in FIG. 2 are merely examples of characteristic quantities, intermediate data, and metadata. It is not essential that all items of information described above are included in data detected by the base level detection unit 60, the low level detection unit 70, and the high level detection unit 80, respectively. The data may include information other then the items of information described above.

Figure 3:
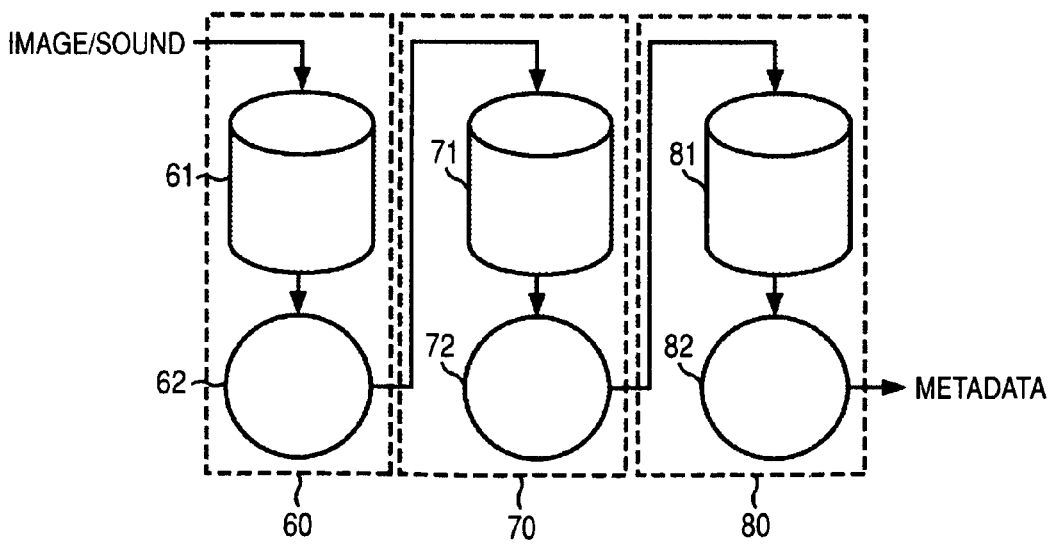
FIG. 3 is an illustration for explaining the detection of metadata carried out by the metadata extraction apparatus shown in FIG. 1.

FIG. 3 is an illustration for explaining the detection of metadata carried out by the metadata extraction apparatus 40. As shown in FIG. 3, image data and sound data constituting input data is first supplied to a buffer 61 of the base level detection unit 60 to be accumulated therein. An analysis section 62 of the base level detection unit 60 analyses e.g., one frame worth of image or sound data accumulated in the buffer 61. Thus, characteristic quantities are detected, and data 101 is output.

The data 101 output from the base level detection unit 60 is accumulated in a buffer 71 of the low level detection unit 70 as base level output data. An analysis section 72 of the low level detection unit 70 analyses several tens frames' worth of base level output data accumulated in the buffer 71. Thus, intermediate data is detected, and data 102 is output.

The data 102 output from the low level detection unit 70 is accumulated in a buffer 81 of the high level detection unit 80 as low level output data. An analysis section 82 of the high level detection unit 80 analyses low level output data for several minutes accumulated in the buffer 81. Thus, metadata is detected, and data 103 is output.

As described above, the low level detection unit 70 and the high level detection unit 80 are configured in the output data generating unit 90. Specifically, each of the analysis section 72 and the analysis section 82 is a functional block which is implemented on a software basis. For example, data analyzing processes carried out by the analysis section 72 and the analysis section 82 respectively are managed as two different tasks which are executed using the same processor and the same memory.

Therefore, when the load of the process at the analysis section 72 increases, for example, the load of the process at the analysis section 82 needs to be made relatively small. Conversely, when the load of the process at the analysis section 82 increases, the load of the process at the analysis section 72 needs to be made relatively small. The balance between the loads of the low level detection unit 70 and the high level detection unit 80 as thus described is controlled by the controller 50.

For example, the controller 50 controls the balance between the loads of the low level detection unit 70 and the high level detection unit 80 according to the priority of the processes at the low level detection unit 70 and the high level detection unit 80. Specifically, when the process at the low level detection process 70 has a higher priority, the task associated with the process at the analysis section 72 is executed with priority, for example, in the case of the two tasks executed using the same processor and the same memory. When the process at the high level detection unit 80 has a higher priority, the task associated with the process at the analysis section 82 is executed with priority in the case of the two tasks executed using the same processor and the same memory.

Figure 4:
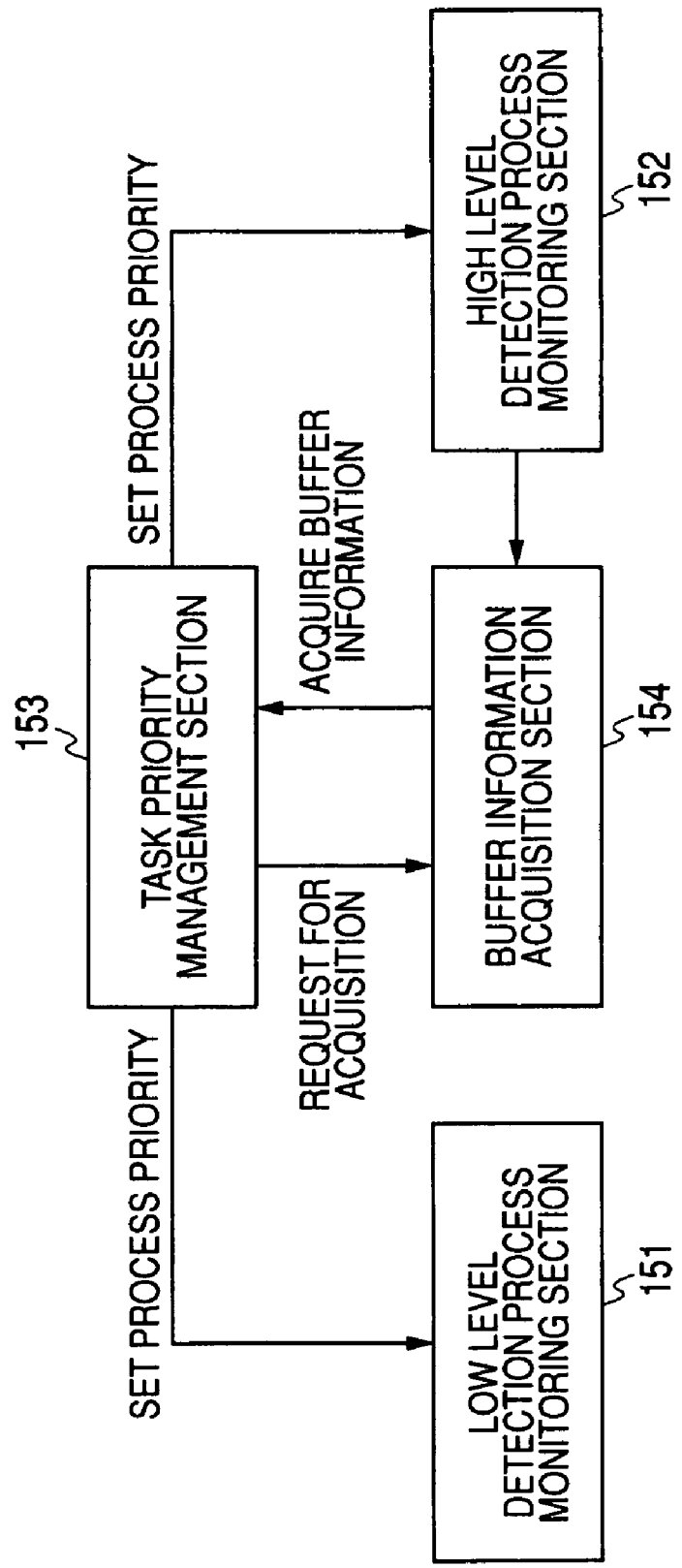
FIG. 4 is a block diagram showing an example of a functional configuration of a program installed in a controller which is shown in FIG. 1.

FIG. 4 is a block diagram showing an example of a functional configuration of a program installed in the controller 50.

A low level detection process monitoring section 151 shown in FIG. 4 monitors the state of execution of the process at the low level detection unit 70. For example, the low level detection process monitoring section 151 identifies the amount of the base level output data accumulated in the buffer 71 and controls the priority of the task associated with the process at the analysis section 72.

A high level detection process monitoring section 152 monitors the state of execution of the process at the high level detection unit 80. For example, the high level detection process monitoring section 152 identifies the amount of the low level output data accumulated in the buffer 81 and controls the priority of the task associated with the process at the analysis section 82.

Information on the amount of the low level output data accumulated in the buffer 81 identified by the high level detection process monitoring section 152 is supplied to a buffer information acquisition section 154.

A task priority management section 153 outputs buffer information acquisition requests to the buffer information acquisition section 154, for example, at preset time intervals to acquire the information on the low level output data accumulated in the buffer 81 from the buffer information acquisition section 154. The task priority management section 153 determines the priority of the process at the low level detection unit 70 and the process at the high level detection unit 80 based on the information on the amount of the low level output data accumulated ion the buffer 81.

As described above, the high level detection unit 80 accumulates low level output data associated with several minutes' worth of temporally continuous input data and detects metadata by comparing a predetermined section of the accumulated low level output data with another section of the data or comparing the low level output data accumulated in the buffer 81 with low level output data which is currently input. Therefore, the process at the high level detection unit 80 cannot be executed unless a sufficient amount of low level output data is accumulated in the buffer 81.

The task priority management section 153 determines whether a sufficient amount of low level output data has been accumulated in the buffer 81. When it is determined that a sufficient amount of low level output data has been accumulated, the priority of the process at the high level detection unit 80 or the priority of the task associated with the process at the analysis section 82 is set relatively high, and the priority of the process at the low level detection unit 70 or the priority of the task associated with the process at the analysis section 72 is set relatively low.

When it is determined that a sufficient amount of low level output data has not been accumulated yet, the priority of the process at the low level detection unit 70 or the priority of the task associated with the process at the analysis section 72 is set relatively high, and the priority of the process at the high level detection unit 80 or the priority of the task associated with the process at the analysis section 82 is set relatively low.

The task priority management section 153 outputs information on the priority to be set for the process at the low level detection unit 70 to the low level detection process monitoring section 151. The low level detection process monitoring section 151 causes the task associated with the process at the analysis section 72 to be executed with the priority of the process at the low level detection unit 70 or the priority of the task associated with the process at the analysis section 72 set relatively high or low.

The task priority management section 153 outputs information on the priority to be set for the process at the high level detection unit 80 to the high level detection process monitoring section 152. The high level detection process monitoring section 152 causes the task associated with the process at the analysis section 82 to be executed with the priority of the process at the high level detection unit 80 or the priority of the task associated with the process at the analysis section 82 set relatively high or low.

Figure 5:
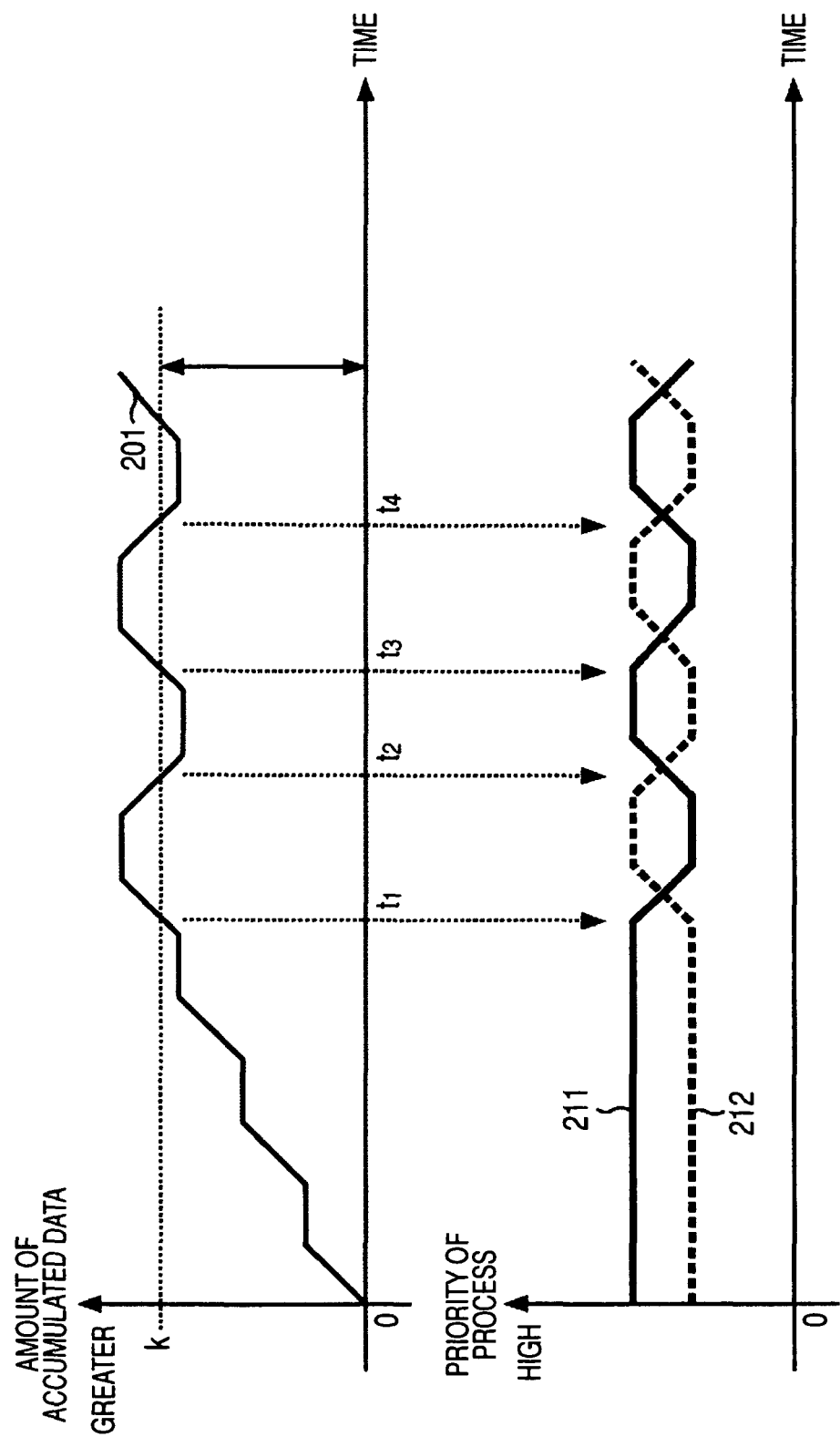
FIG. 5 is a graph showing the amount of accumulated data which changes as time passes and a graph showing the priority of processes.

As a result, the priority of the process at the low level detection unit 70 and the priority of the process at the high level detection process unit 80 undergo respective changes as time passes, for example, as shown in FIG. 5.

The graph on the top side of FIG. 5 shows the amount of low level output data accumulated in the buffer 81 along the vertical axis and time along the horizontal axis to represent the amount of low level output data changing as time passes by a line 201. The graph on the bottom side of FIG. 5 shows priority along the vertical axis and time along the horizontal axis to represent the priority of the process at the low level detection unit 70 changing as time passes by a line 211 and the priority of the process at the high level detection unit 80 changing as time passes by a dotted line 212.

When the amount of low level output data accumulated in the buffer 81 exceeds a threshold k, the priority of the process at the high level detection unit 80 is set relatively high. When the amount of low level output data accumulated in the buffer 81 is not in the excess of the threshold k, the priority of the process at the high level detection unit 80 is set relatively low.

As indicated by the line 201, the amount of low level output data accumulated in the buffer 81 gradually increases during the period from a point immediately after the beginning of the process (time axis: 0) until a point in time t1, but the amount does not reach the threshold k. During that period, the line 211 is in a position higher than the dotted line 212 in the figure. That is, the priority of the process at the low level detection unit 70 is set relatively high, and the priority of the process at the high level detection unit 80 is set relatively low.

When time passes beyond the point t1 and the amount of low level output data accumulated in the buffer 81 (line 201) exceeds the threshold k, the relative priority of the process at the low level detection unit 70 and the relative priority of the process at the high level detection unit 80 are reversed. In FIG. 5, the line 211 and the dotted line 212 cross each other, and the dotted line 212 becomes higher than the line 211.

Beyond the time t1, the process at the high level detection unit 80 is executed with a higher priority, and the low level output data accumulated in the buffer 81 is read out to detect metadata. In the meantime, the process at the low level detection unit 70 is given a lower priority, and it takes a longer time, for example, to detect intermediate data. As a result, the amount of low level output data accumulated in the buffer 81 (line 201) decreases. Specifically, when the process at the high level detection unit 80 is executed with a higher priority, the amount of low level data read from the buffer 81 per unit time as a result of the process at the high level detection unit 80 is greater than the amount of low level output data accumulated in the buffer 81 per unit time as a result of the process at the low level detection unit 70.

At a point in time t2, the amount of low level output data accumulated in the buffer 81 (line 201) falls below the threshold k again.

When time passes beyond the point t2, reversal occurs between the relative priority of the process at the low level detection unit 70 and the relative priority of the process at the high level detection unit 80. In FIG. 5, the line 211 and the dotted line 212 cross each other again, and the line 211 becomes higher than the dotted line 212. This time, the process at the low level detection unit 70 is executed with a higher priority. The amount of low level data read from the buffer 81 per unit time as a result of the process at the high level detection unit 80 becomes smaller than the amount of low level output data accumulated in the buffer 81 per unit time as a result of the process at the low level detection unit 70. Therefore, the amount of low level output data accumulated in the buffer 81 increases.

Similarly, the amount of low level output data accumulated in the buffer 81 exceeds or falls below the threshold k at points in time t3 and t4, respectively. Therefore, reversal also takes place between the relative priority of the process at the low level detection unit 70 and the relative priority of the process at the high level detection unit 80, and the line 211 and the dotted line 212 in FIG. 5 cross each other at those points in time.

The balance between the loads on the low level detection unit 70 and the high level detection unit 80 is properly controlled in such a manner. Thus, resources such as the processor and memory can be utilized efficiently, and metadata can be extracted quickly.

An example of a detection control process carried out by the controller 50 will now be described with reference to the flow chart of FIG. 6.

First, the task priority management section 153 determines at step S101 whether it is necessary to execute the detection control process or not. For example, when contents have been recorded and there is a need for extracting metadata of the contents with the metadata extraction apparatus 40, it is determined at step S101 that the execution of the detection control process is required. The process then proceeds to step S102.

Figure 7:
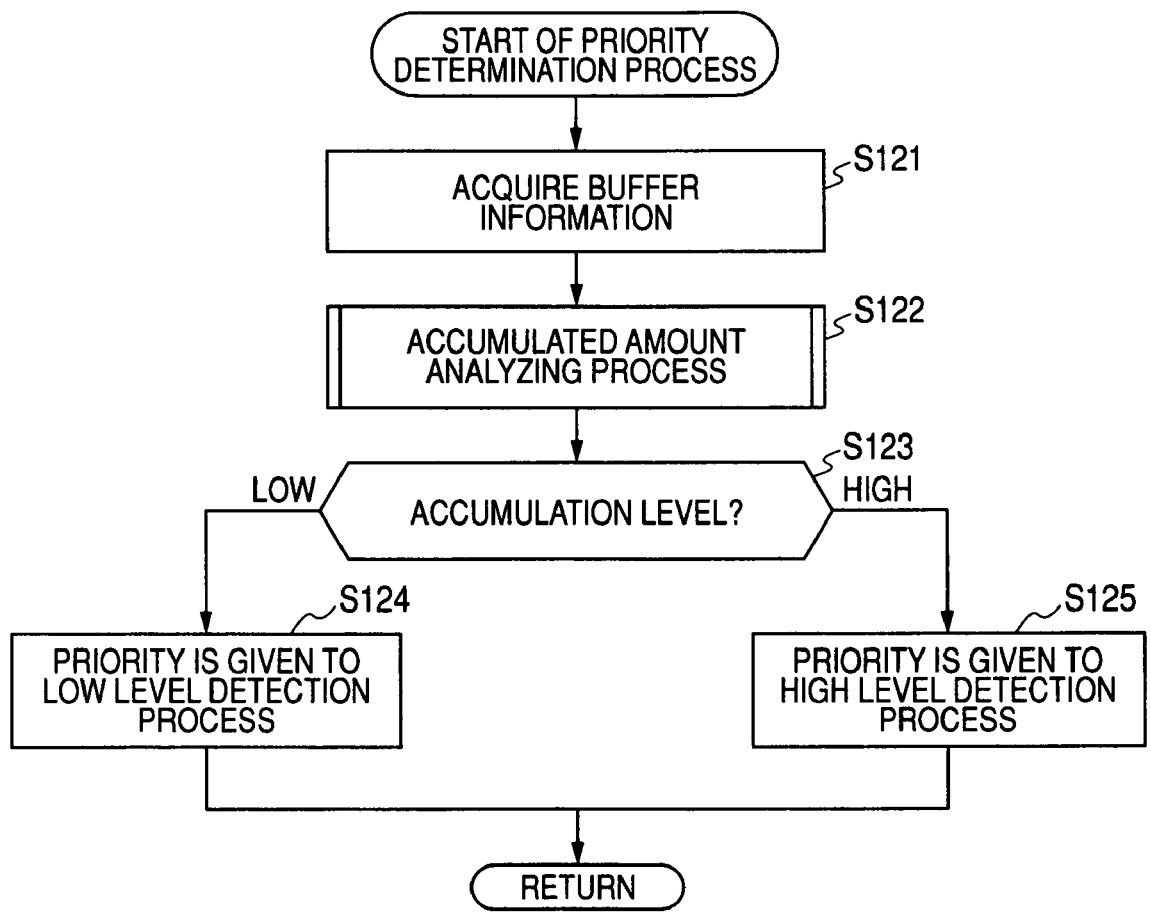
FIG. 7 is a flow chart for explaining an example of a priority determination process.

At step S102, the task priority management section 153 executes a priority determination process which will be described later with reference to FIG. 7. Thus, the relative priority of each of the process at the low level detection unit 70 and the process at the high level detection unit 80 is determined.

At step S103, the task priority management section 153 determines whether it is necessary to reset the priority of the process at the low level detection unit 70 and the process at the high level detection unit 80. Based on the result of the process at step S102, it is determined, for example, whether to reverse the relative priority of the process at the low level detection unit 70 and the relative priority of the process at the high level detection unit 80 or not.

Referring to the initial setting of the metadata extraction apparatus 40, the relative priority of the process at the low level detection unit 70 is set higher, and the relative priority of the process at the high level detection unit 80 is set lower.

When it is determined at step S103 that the priority of the process at the low level detection unit 70 and the process at the high level detection unit 80 must be reset, the process proceeds to step S104.

At step S104, the task priority management section 153 resets the priority of the process at the low level detection unit 70 and the priority of the process at the high level detection unit 80. At this time, based on information output from the task priority management section 153, the low level detection process monitoring section 151 causes the task associated with the process at the analysis section 72 to be executed with the priority of the process at the low level detection unit 70 or the priority of the task associated with the process at the analysis section 72 set relatively high or low. The high level detection process monitoring section 152 causes the task associated with the process at the analysis section 82 to be executed with the priority of the process at the high level detection unit 80 or the priority of the task associated with the process at the analysis section 82 set relatively high or low.

When it is determined after the process of step S104 or at step S103 that there is no need for resetting the priority of the process at the low level detection unit 70 and the process at the high level detection unit 80, the process returns to step S101, and the processes at the step S101 and the steps subsequent thereto are repeated.

The detection control process is terminated when it is determined at step S101 that the execution of the process has become unnecessary because the metadata extraction apparatus 40 has finished the extraction of metadata of the contents.

A specific example of the priority determination process at the step S102 in FIG. 6 will now be described with reference to the flow chart of FIG. 7.

At step S121, the task priority management section 153 acquires buffer information. At this time, the task priority management section 153 outputs a request for acquisition of buffer image to the buffer information acquisition section 154 to acquire information on the amount of low level output data accumulated in the buffer 81 from the buffer information acquisition section 154 as buffer information.

Figure 8:
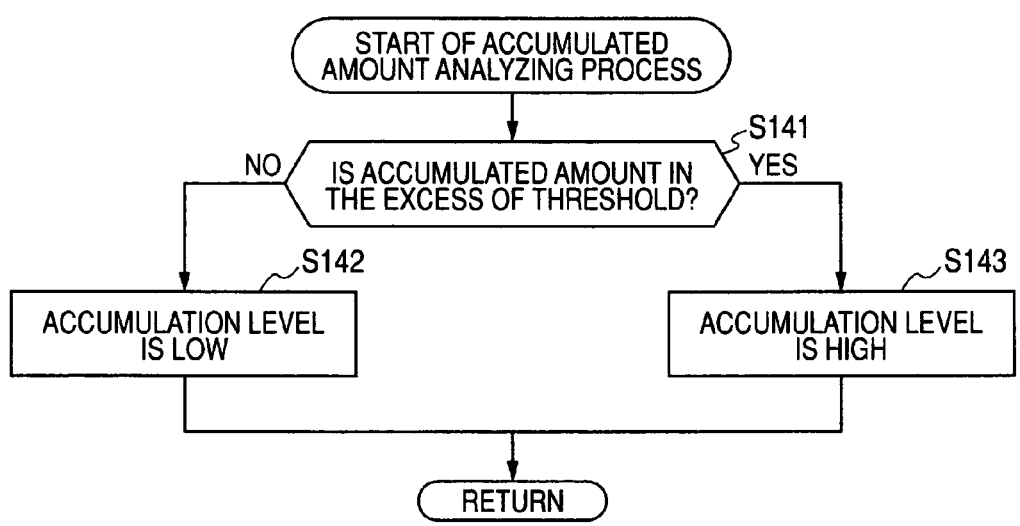
FIG. 8 is a flow chart for explaining an example of an accumulated amount analyzing process.
Figure 9:
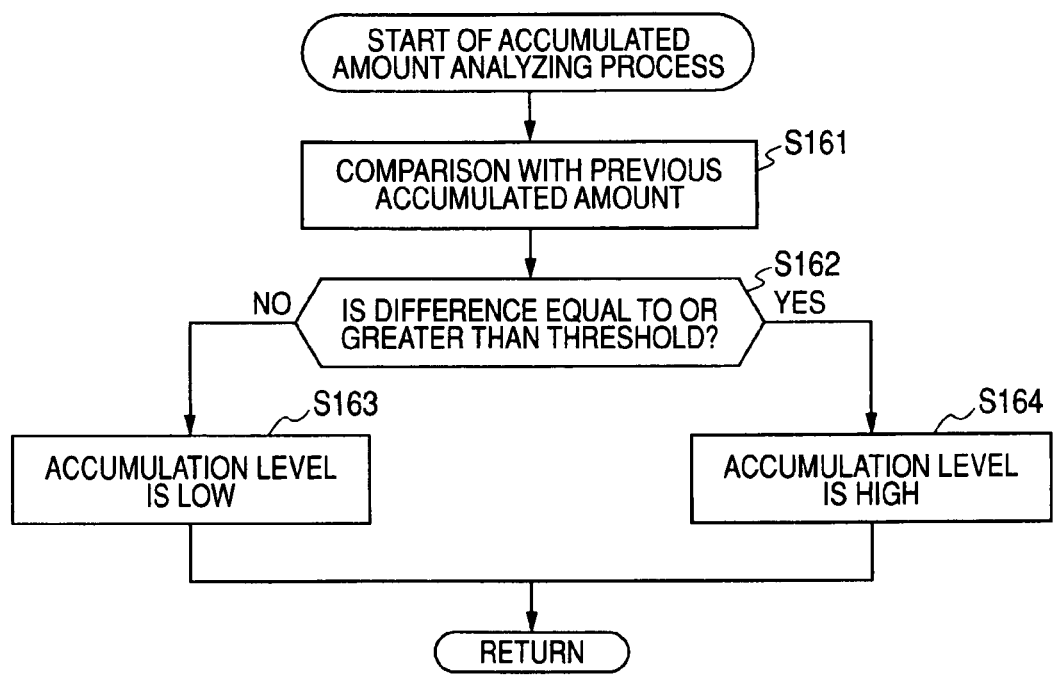
FIG. 9 is a flow chart for explaining another example of the accumulated amount analyzing process.

At step S122, the task priority management section 153 executes an accumulated amount analyzing process which will be described later with reference to FIGS. 8 and 9. Thus, the level of the amount of low level output data accumulated in the buffer 81 is identified.

A specific example of the accumulated amount analyzing process at step S122 shown in FIG. 7 will now be described with reference to the flow chart of FIG. 8.

At step S141, the task priority management section 153 determines whether a value included in the buffer information acquired at step S121 representing the amount of low level output data accumulated in the buffer 81 exceeds the preset threshold k or not.

When it is determined at step S141 that the value representing the amount of low level output data accumulated in the buffer 81 is not in the excess of the threshold k, the process proceeds to step S142 at which an accumulation level representing the level of the amount of low level output data accumulated in the buffer 81 is identified as "low".

When it is determined at step S141 that the value representing the amount of low level output data accumulated in the buffer 81 is in the excess of the threshold k, the process proceeds to step S143 at which the accumulation level representing the level of the amount of low level output data accumulated in the buffer 81 is identified as "high".

An example in which the level of accumulation is determined based on one threshold k has been described. For example, a threshold k1 and a threshold k2 lower than the threshold k1 may alternatively be set. The accumulation level may be identified as "high" when it exceeds the threshold k1, and the accumulation level may be identified as "low" when it falls below the threshold k2.

Alternatively, the accumulation level may be identified by comparing an increase or decrease (a difference) in the amount of low level output data accumulated in the buffer 81 with a threshold instead of directly comparing the value of the amount of low level output data accumulated in the buffer 81 with a threshold. FIG. 9 is a flow chart for explaining the alternative specific example of the accumulated amount analyzing process at step S122 in FIG. 7. That is, the flow chart is presented to explain the example in which the accumulation level is determined based on an increase or decrease in the amount of low level output data accumulated in the buffer 81.

At step S161, the task priority management section 153 compares the value included in the buffer information acquired at the current cycle of step S121 representing the amount of low level output data accumulated in the buffer 81 with the value included in the buffer information acquired at the previous cycle of step S121 representing the amount of low level output data accumulated in the buffer 81 to calculate a difference between those values.

At step S162, the task priority management section 153 determines whether the differential value obtained by the process at step S161 is in the excess of a preset threshold s or not.

When it is determined at step S162 that the differential value is not in the excess of the threshold s, the process proceeds to step S163 at which the accumulation level representing the level of the amount of low level output data accumulated in the buffer 81 is identified as "low".

When it is determined at step S162 that the differential value is in the excess of the threshold s, the process proceeds to step S164 at which the accumulation level representing the level of the amount of low level output data accumulated in the buffer 81 is identified as "high".

An example in which the level of accumulation is determined based on one threshold s has been described. For example, a threshold s1 and a threshold s2 lower than the threshold s1 may alternatively be set. The accumulation level may be identified as "high" when it exceeds the threshold s1, and the accumulation level may be identified as "low" when it falls below the threshold s2.

Further, the accumulation level may alternatively be determined from the magnitude of a difference per time. For example, it may be determined at step S162 whether a straight line obtained based on elapsed time from the time of the previous acquisition of buffer information and the difference of the value representing the amount of low level output data accumulated in the buffer 81 from the previous value has a slope (differential value) in the excess of a threshold or not.

A description has been made above on an example in which the task priority management section 153 calculates a differential value between values representing the amount of low level output data accumulated in the buffer 81. For example, the buffer information acquisition section 154 may calculate such a differential value periodically and may supply the differential value to the task priority management section 153 in response to a request for acquisition of buffer information.

Referring to FIG. 7 again, the priority determination process proceeds from the process at step S122 to step S123 at which the task priority management section 153 determines the accumulation level identified as a result of the process at step S122.

When the accumulation level is determined to be "low" at step S123, the process proceeds to step S124 at which the task priority management section 153 exercises control such that a higher priority is given to the process at the low level detection unit 70. When the accumulation level is determined to be "high" at step S123, the process proceeds to step S125 at which the task priority management section 153 exercises such that a higher priority is given to the process at the high level detection unit 80.

Figure 6:
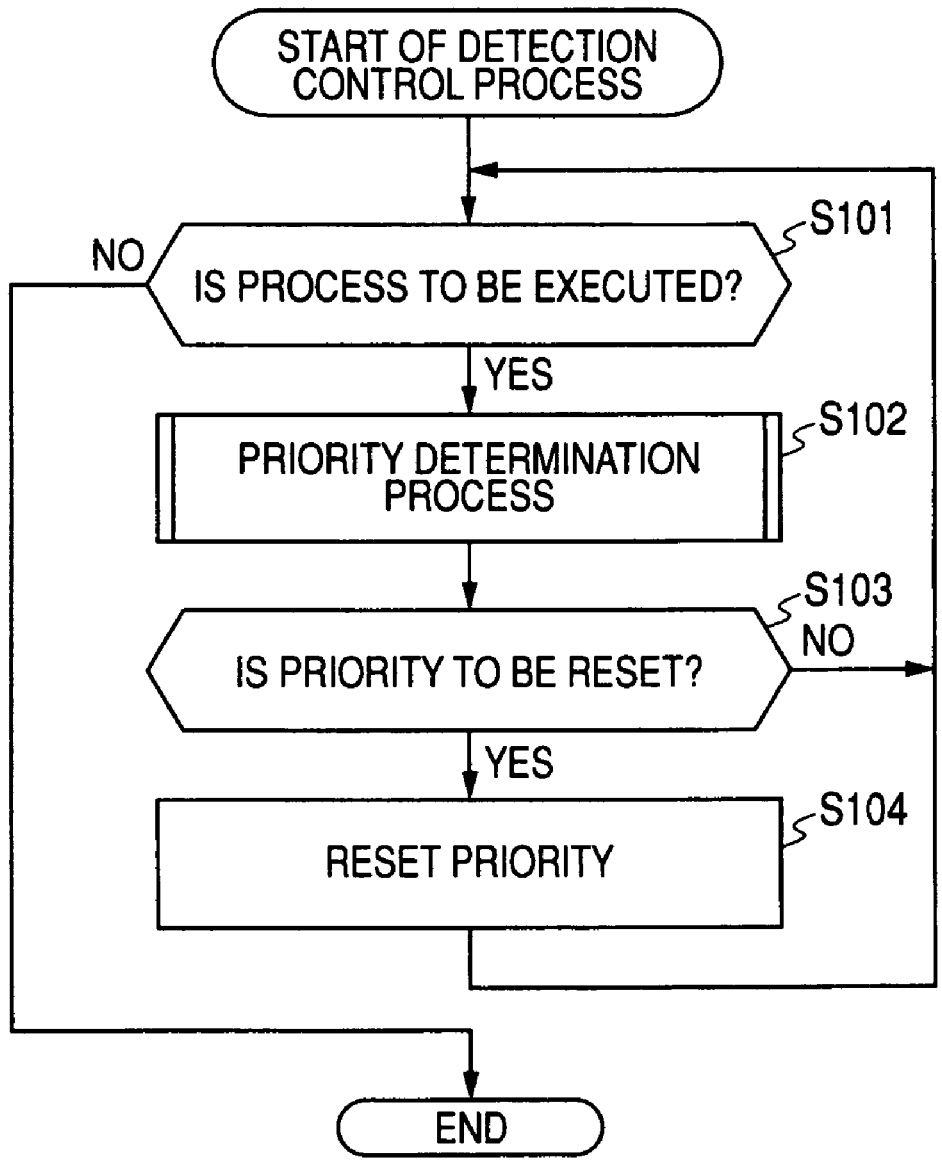
FIG. 6 is a flow chart for explaining an example of a detection control process.

Thus, it is determined through the process at step S103 in FIG. 6 whether the current priority of the process at the low level detection unit 70 and the current priority of the process at the high level detection unit 80 must be changed or whether the relative priorities of the processes must to be reversed. As a result, the low level detection process monitoring section 151 causes the task associated with the process at the analysis section 72 to be executed with the priority of the process at the low level detection unit 70 or the priority of the task associated with the process at the analysis section 72 set relatively high or low. The high level detection process monitoring section 152 causes the task associated with the process at the analysis section 82 to be executed with the priority of the process at the high level detection unit 80 or the priority of the task associated with the process at the analysis section 82 set relatively high or low.

A description has been made above on an example in which step S124 or S125 is carried out to give a higher priority to the process at the low level detection unit 70 or the process at the high level detection unit 80, respectively. For example, it may alternatively determined at step S124 or S125 whether to reverse the relative priority of the process at the low level detection unit 70 and the relative priority of the process at the high level detection unit 80.

The detection of intermediate data and metadata carried out by the low level detection unit 70 and the high level detection unit 80 included in the output data generation unit 90 is controlled as described above.

Thus, the balance between the loads on the low level detection unit 70 and the high level detection unit 80 is properly controlled. As a result, resources such as the processor and the memory can be efficiently utilized, and metadata can be extracted quickly.

Such an arrangement makes it possible to configure the output data generation unit 90 by, for example, installing a predetermined program in a general-purpose microcomputer. Specifically, both of the process at the low level detection unit 70 and the process at the high level detection unit 80 can be efficiently executed using the same processor and memory.

Therefore, the function of extracting metadata is not limited to the implementation in single-purpose AV (audio-visual) home electronics such as HDD recorders. The functions can be easily provided or transplanted in various types of electronic apparatus having image recording and reproducing functions such as personal computers and game machines.

A description has been made above on an embodiment in which metadata is extracted by dividing input data into three levels and analyzing the data at the base level detection unit 60, the low level detection unit 70, and the high level detection unit 80 of the metadata extraction apparatus 40. For example, analysis may alternatively be carried out at only the base level detection unit 60 and the low level detection unit 70.

In this case, low level output data output by the low level detection unit 70 constitutes output data of the metadata extraction apparatus 40.

For example, the metadata extraction apparatus 40 may include only the low level detection unit 70, the high level detection unit 80, and the controller 50. That is, the metadata extraction apparatus 40 may include only the output data generation unit 90 and the controller 50.

In this case, input data is directly supplied to the low level detection unit 70. For example, the low level detection unit 70 detects characteristic quantities from the input data and also detects intermediate data based on the characteristic quantities thus detected.

When the metadata extraction apparatus 40 includes only the output data generation unit 90 and the controller 50, for example, the output data generation unit 90 and the controller 50 may be integrated further such that the metadata extraction apparatus 40 will include only the controller 50. Specifically, all of the processes of detecting characteristic quantities, detecting intermediate data, and detecting metadata may be executed by software instead of providing dedicated hardware to be used as the base level detection unit 60 and the output data generation unit 90. Thus, the metadata extraction apparatus 40 may be configured using, for example, a general-purpose computer.

Furthermore, after metadata is extracted as a result of the process at the high level detection unit 80, the metadata may be accumulated in another buffer, and different pieces of metadata may be extracted by another detection unit based on the accumulated metadata.

In this case, the amounts of data accumulated in the buffer 81 and the other buffer may be further compared with each other, and the priority of the process at the high level detection unit 80 and the process at the other detection unit may be set relatively high or low accordingly.

Figure 10:
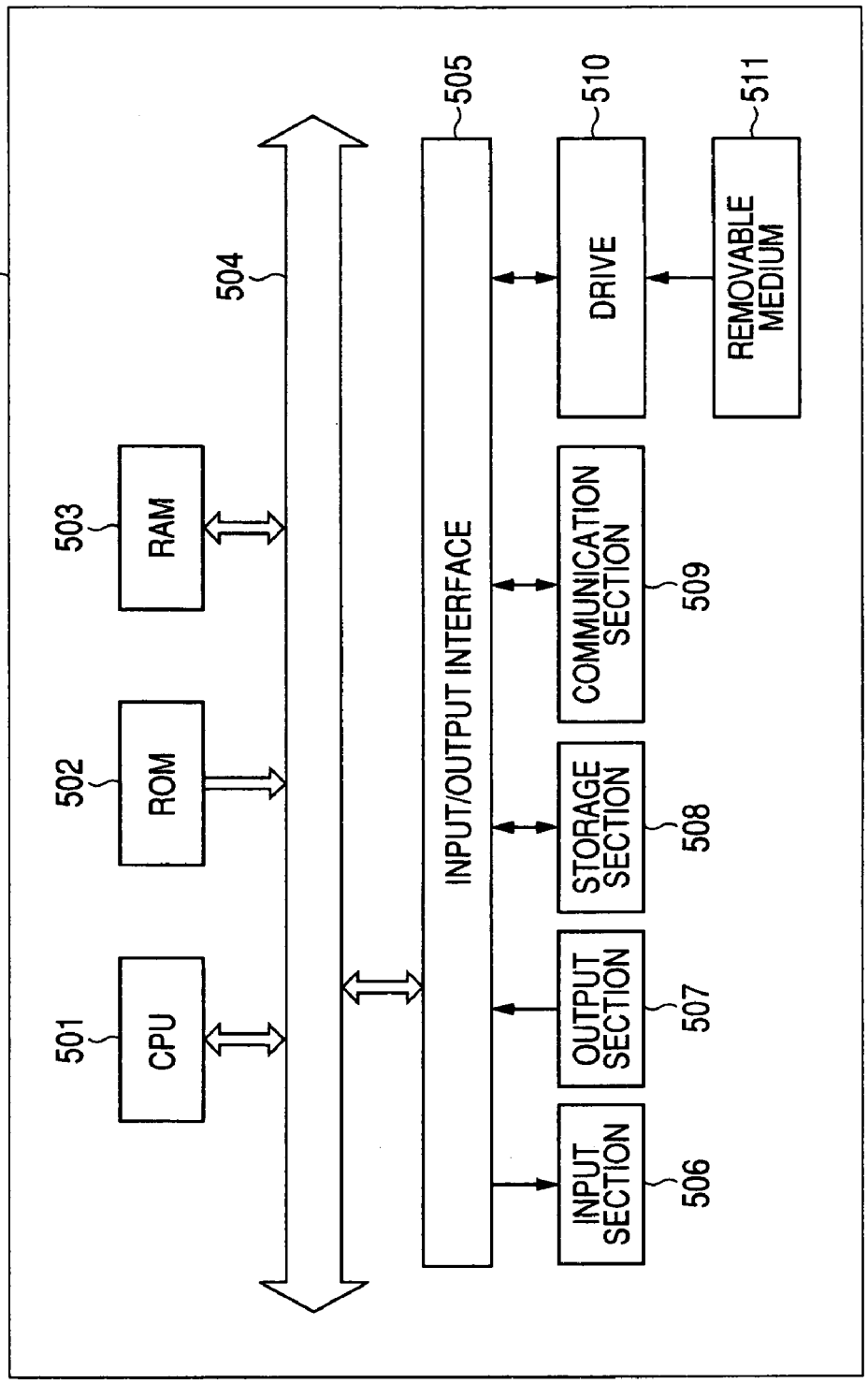
FIG. 10 is a block diagram showing an example of a configuration of a personal computer.

The series of processes described above may be executed by hardware, and they may alternatively be executed by software. When the series of processes is executed by software, programs constituting the software are installed in a computer incorporated in dedicated hardware or in a general purpose personal computer 500 as shown in FIG. 10 by way of example which is enabled for the execution of various functions when various programs are installed therein. The programs may be installed from a network or a recording medium.

Referring to FIG. 10, a CPU (Central Processing Unit) 501 executes various processes according to programs stored in a ROM (Read Only Memory) 502 or programs loaded into a RAM (Random Access Memory) 503 from a storage section 508. Data required for the CPU 501 to execute the various processes may be also stored in the RAM 503 as occasion demands.

The CPU 501, the ROM 502, and the RAM 503 are connected to each other through a bus 504. An input/output interface 505 is also connected to the bus 504.

An input section 506 including a keyboard and a mouse, an output section 507 including a display that is a CRT (Cathode Ray Tube) or LCD (Liquid Crystal Display) and a speaker, the storage section 508 including a hard disk, and a communication section 509 including a modem and a network interface card such as a LAN card are connected to the input/output interface 505. The communication section 509 performs communication processes through a network including internet.

A drive 510 is also connected to the input/output interface 505 as occasion demands, and an appropriate removable medium 511 such as a magnetic disk, an optical disk, a magneto-optical disk, or a semiconductor memory is inserted in the drive. A computer program read from the medium is installed in the storage section 508 as occasion demands.

When the above-described series of processes is executed by software, the programs constituting the software are installed from a network such as internet or a recording medium such as the removable medium 511.

The recording medium is not limited to the removable medium 511 shown in FIG. 10 which is provided to distribute programs separately from the body of the apparatus and which is a magnetic disk such as a floppy disk (registered trademark), an optical disk such as a CD-ROM (Compact Disk-Read Only Memory) or a DVD (Digital Versatile Disk), a magneto-optical disk such as an MD (Mini-Disk: registered trademark), or a semiconductor memory having the programs recorded therein. The recording medium may alternatively be incorporated in the body of the apparatus in advance to be distributed to a user by storing the programs in the ROM 502 or the hard disk included in the storage section 508.

Obviously, the steps for executing series of processes described above in this specification cover not only the processes which are to be time-sequentially executed in the order they are described but also processes which are not necessarily executed in a time-sequential manner and which may be executed in parallel or separately instead.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus which detects concomitant information associated with a time at which data satisfying a preset condition is supplied within a continuous period of time from input data that is temporally continuously input, the apparatus comprising:
　　a change information detecting means for detecting information on a change in a temporally continuous characteristic quantity based on the characteristic quantity that is included in a first period's worth of input data that is temporally continuously input;
　　an accumulation means for accumulating the characteristic quantity change information output by the change information detecting means to obtain characteristic quantity change information associated with temporally continuous input data for a second period of time longer than the first period of time;
　　a concomitant information detecting means for detecting the concomitant information based on the characteristic quantity change information accumulated in the accumulation means;
　　an accumulated amount identifying means for identifying the amount of characteristic quantity change information accumulated in the accumulation means; and
　　a priority determining means for determining the priority of the process of the change information detecting means and the process of the concomitant information detecting means based on the accumulated amount identified by the accumulated amount identifying means.

2. An information processing apparatus according to claim 1, wherein the change information detecting means and the concomitant information detecting means detect the characteristic quantity change information and the concomitant information, respectively, using the same information processing resource.

3. An information processing apparatus according to claim 2, wherein the change information detecting means detects the change information in an amount per unit time greater than the amount of the change information read out from the accumulation means by the concomitant information detecting means to detect the concomitant information and accumulates the change information in the accumulation means, when the priority of the process of the change information detecting means is higher than the priority of the process of the concomitant information detecting means.

4. An information processing apparatus according to claim 1, wherein the accumulated amount identifying means identifies the accumulated amount by comparing the amount of the characteristic quantity change information accumulated in the accumulation means with a preset threshold.

5. An information processing apparatus according to claim 1, wherein the accumulated amount identifying means identifies the accumulated amount by comparing the amount of the characteristic quantity change information currently accumulated in the accumulation means with the amount of the characteristic quantity change information which has been accumulated in the accumulation means at a time preceding the current time by a predetermined amount.

6. An information processing apparatus according to claim 1, wherein the temporally continuous information is information of a dynamic image or sound and wherein the concomitant information is detected as metadata of the dynamic image or sound.

7. An information processing method for an information processing apparatus which detects concomitant information associated with a time at which data satisfying a preset condition is supplied within a continuous period of time from input data that is temporally continuously input and which includes a change information detecting means detecting information on a change in a temporally continuous characteristic quantity based on the characteristic quantity that is included in a first period's worth of input data that is temporally continuously input, an accumulation means for accumulating the characteristic quantity change information output by the change information detecting means to obtain characteristic quantity change information associated with temporally continuous input data for a second period of time longer than the first period of time, and a concomitant information detecting means for detecting the concomitant information based on the characteristic quantity change information accumulated in the accumulation means, the method comprising the steps of:

identifying the amount of characteristic quantity change information accumulated in the accumulation means; and determining the priority of the process of the change information detecting means and the process of the concomitant information detecting means based on the accumulated amount identified by the accumulated amount identifying means.

8. A non-transitory recording medium having tangibly embodied thereon a program for causing a computer to execute a process of detecting concomitant information associated with a time at which data satisfying a preset condition is supplied within a continuous period of time from input data that is temporally continuously input, the program causing the computer to function as:

a change information detecting means for detecting information on a change in a temporally continuous characteristic quantity based on the characteristic quantity that is included in a first period's worth of input data that is temporally continuously input;

an accumulation means accumulating the characteristic quantity change information output by the change information detecting means to obtain characteristic quantity change information associated with temporally continuous input data for a second period of time longer than the first period of time;

a concomitant information detecting means for detecting the concomitant information based on the characteristic quantity change information accumulated in the accumulation means;

an accumulated amount identifying means for identifying the amount of characteristic quantity change information accumulated in the accumulation means; and a priority determining means for determining the priority of the process of the change information detecting means for and the process of the concomitant information detecting means based on the accumulated amount identified by the accumulated amount identifying means.

9. An information processing apparatus which detects concomitant information associated with a time at which data satisfying a preset condition is supplied within a continuous period of time from input data that is temporally continuously input, the apparatus comprising:

a change information detecting unit configured to detect information on a change in a temporally continuous characteristic quantity based on the characteristic quantity that is included in a first period's worth of input data that is temporally continuously input;

an accumulation unit configured to accumulate the characteristic quantity change information output by the change information detecting unit to obtain characteristic quantity change information associated with temporally continuous input data for a second period of time longer than the first period of time;

a concomitant information detecting unit configured to detect the concomitant information based on the characteristic quantity change information accumulated in the accumulation unit;

an accumulated amount identifying unit configured to identify the amount of characteristic quantity change information accumulated in the accumulation unit; and a priority determining unit configured to determine the priority of the process of the change information detecting unit and the process of the concomitant information detecting unit based on the accumulated amount identified by the accumulated amount identifying unit.

* * * * *